United States Patent [19]

Palmlin et al.

[11] Patent Number: 5,015,484

[45] Date of Patent: May 14, 1991

[54] ROOT VEGETABLE COATED FOODSTUFF

[75] Inventors: Peter Palmlin; Marianne Rudberg, both of Helsingborg, Sweden

[73] Assignee: Nestec S.A., Vevey, Switzerland

[21] Appl. No.: 492,941

[22] Filed: Mar. 13, 1990

Related U.S. Application Data

[62] Division of Ser. No. 321,364, Mar. 9, 1989, Pat. No. 4,919,953.

[30] Foreign Application Priority Data

Mar. 19, 1988 [EP] European Pat. Off. ........ 88104427.5

[51] Int. Cl.$^5$ ..................... A23L 1/214; A23L 1/217; A23L 1/314; A23L 1/325
[52] U.S. Cl. ........................................ 426/92; 426/96; 426/100; 426/102
[58] Field of Search ................... 426/92, 96, 100, 102, 426/273, 293, 295, 296, 438

[56] References Cited

U.S. PATENT DOCUMENTS

| | | |
|---|---|---|
| 3,486,904 | 12/1969 | Ziegler .............................. 426/92 X |
| 3,622,348 | 11/1971 | Malin ................................. 426/293 |
| 3,761,282 | 9/1973 | Shatila . |
| 3,976,798 | 8/1976 | Young et al. ...................... 426/291 |
| 4,272,553 | 6/1981 | Bengtsson et al. ................ 426/241 |
| 4,351,850 | 9/1982 | Costamagna et al. ............. 426/302 |
| 4,456,624 | 6/1984 | Blantz et al. ......................... 426/96 |
| 4,478,861 | 10/1984 | Montgomery et al. ............. 426/295 |
| 4,559,232 | 12/1985 | Glantz et al. ........................ 426/96 |
| 4,762,083 | 8/1988 | Wadell ................................. 118/16 |
| 4,808,423 | 2/1989 | Hansson ............................. 426/273 |

*Primary Examiner*—Arthur L. Corbin
*Attorney, Agent, or Firm*—Vogt & O'Donnell

[57] ABSTRACT

A foodstuff is coated with an edible heat-settable adhesive fluid which is coated with frozen prefried particles of fresh root vegetables which, upon being prefried, have a moisture content of from 20% to 50% by weight based upon the total weight of the prefried particles. The coated foodstuff is fried and frozen.

11 Claims, No Drawings

ROOT VEGETABLE COATED FOODSTUFF

CROSS-REFERENCE TO RELATED APPLICATION

This application is a divisional application of application Ser. No. 07/321,364, filed Mar. 9, 1989, now U.S. Pat. No. 4,919,953.

BACKGROUND OF THE INVENTION

The present invention relates to the production of a novel coated foodstuff and more particularly to a foodstuff coated with a particulate material derived from fresh root vegetables.

In the preparation of frozen coated food products such as fish, meat or vegetables suitable for oven-cooking, the foodstuff is usually coated with batter, breaded, prefried, deep-frozen and then packaged. The breading material is normally a particulate material such as bread crumbs or shredded cheese, or it may be a particulate material derived from dehydrated potato, for example, potato flakes, potato powder or potato granules. The average size of the particles is such that they usually have an average diameter of from 0.1 to 2.0 mm and the maximum volume of a particle is not usually more than about 10 cubic millimetres. The amount of breading material used in conventional procedures is normally not more than 10% by weight based on the total weight of the product.

It would, however, be very desirable to use particulate material derived from fresh root vegetables, such as potatoes, not only from an organoleptic point of view but also because the final product would have a significantly lower fat content as compared with products coated with conventional coating materials due to the lower uptake of oil by the fresh vegetable in the pre-frying process. However, all our attempts up to the present time to use such coating materials have not been successful because in conventional equipment the particles of fresh vegetable material tend to stick to the machine or stick together to form agglomerates which complicate the mechanical transport and make it impossible to obtain a satisfactory even coating.

SUMMARY OF THE INVENTION

We have now developed a process for preparing a foodstuff coated with a frozen partially pre-fried particulate material derived from fresh root vegetables in which the particles do not stick to the machine or stick together to form agglomerates and which are distributed evenly upon the foodstuff.

Accordingly, the present invention provides a frozen food product, comprising a foodstuff coated with an edible heatsettable adhesive fluid and a particulate material, which is fried before being deep-frozen characterised in that the particulate material applied is in the form of frozen partially pre-fried particles of fresh root vegetables which particles have a moisture content of from 20% to 50% by weight based on the total weight of the particulate material.

The present invention further provides a process for preparing a frozen food product which comprises coating a foodstuff firstly with an edible heat-settable adhesive fluid and then with a particulate material, and afterwards frying and deep-freezing characterised in that the particulate material is applied in the form of frozen partially pre-fried particles of fresh root vegetables which particles have a moisture content from 0% to 50% based on the total weight of the particulate material.

DETAILED DESCRIPTION OF THE INVENTION

The foodstuff may be any foodstuff which may conventionally be coated with particulate material, for example, vegetables, meat or fish. The foodstuff which may be frozen is usually predusted and coated with the edible adhesive fluid by conventional methods before the frozen particulate material is applied. The edible heat-settable adhesive fluid may be, for instance, any type of batter and Tempura batter is particularly suitable.

Preferably the individual frozen partially pre-fried particles of the fresh root vegetables applied to the foodstuff have a volume greater than 20 cubic millimetres, for example, from 30 to 250, preferably from 40 to 200 and especially from 50 to 150 cubic millimetres. Root vegetables which are of particular interest are those which may be cut into relatively firm, substantially uniform pieces, for example, potatoes, carrots, parsnips, celeriac, onions, turnips or swedes. Especially suitable materials are potato cubes or potato strips.

Advantageously, the amount of frozen partially pre-fried particulate material applied to the foodstuff is between 10 and 70%, more preferably from 15 to 50% and especially from 20 to 40% by weight based on the total weight of the food product.

The particles of the fresh root vegetables are partially pre-fried, conveniently in a deep-fat fryer, preferably to a moisture content of from 25% to 45%, more preferably from 28% to 40% and especially from 30% to 38%. The temperature at which the particles are pre-fried is conveniently from 160° C. to 200° C. and preferably from 165° C. to 195° C. The duration of the pre-frying time may conveniently be from 20 to 100 seconds and preferably from 30 to 90 seconds. Before pre-frying, the particulate material is advantageously blanched, for instance, in water at 80° C. to 90° C. for a few minutes, for example, from 3 to 5 minutes. After pre-frying the particulate material is frozen, for instance, in a fluidised bed freezer to obtain a free-flowing material.

During the pre-frying process, the particulate material picks up a certain amount of oil or fat, for instance from about 20% to 26% by weight based on the total weight of the particulate material. The partially pre-fried particulate material is generally free-flowing with a dry non-sticky surface even when thawed. If the particulate material has a moisture content greater than 50%, there are sticking problems and the product is too soggy whereas if the moisture content is less than 20%, the product is too dry.

Conveniently, the foodstuff is predusted before being coated with the edible adhesive fluid with conventional coating materials such as a free flowing flour or starch, for example, semolina, potato starch, milled cracker meal, etc. If the foodstuff is in the frozen condition, the surface is advantageously thawed to form a thin layer of water thereon for instance, by steaming, before being predusted.

It is desirable that the temperature of the partially pre-fried particulate material does not rise appreciably above freezing point during the coating step and it is preferably applied as cold as possible. An especially advantageous coating system is described in our copending European Patent Application No. 86116229.5 where the average holding time in the system is about 30 minutes.

After having been coated with the particulate material, the coated foodstuff is fried, for example by deep-fat frying conveniently at 160° C. to 200° C. for 20 to 120 seconds.

In this invention, the application to a foodstuff of a particulate coating material in the form of frozen partially pre-fried particles of fresh root vegetables in larger amounts and comprising particles of a larger size in comparison with conventional coated food products results in an entirely new product concept, with especially desirable organoleptic properties, and a lower fat content the production of which has hitherto not been possible. The products also have an interesting, attractive appearance quite different from conventionally coated products.

The following Example further illustrates the present invention.

EXAMPLE

High quality Saturna potatoes with dry matter content of 22–24% were peeled, washed and cut in an Urschel GK cutter into strips having dimensions of 3.5×9.5×3.2 mm. These strips were blanched at 85° C. for 4 minutes and pre-fried for 45 seconds at 185° C. in a fryer where the inlet oil temperature was 190° C. and the outlet temperature was 170° C. The prefried potato strips had a dry matter content of from 64–68% by weight and a fat content of 22–24% by weight and were free-flowing with a dry non-sticky surface. They were then deep frozen.

Battered frozen fish portions which had initially been deglazed with stam and predusted with grilled cracker meal 454, were coated with 35% by weight of frozen prefried potato strips based on the total weight of the food products the frozen prefried potato strips having previously been tempered to −2° C. The coated fish portions were then deep-fat fried at 180° C. for 60 seconds and then deep-frozen. The final product weight was 50 g.

The final pre-fried coated fish product had the following composition by weight:

| | |
|---|---|
| Fish | 53% |
| Milled cracker meal 454 | 4% |
| Batter | 18% |
| Potato (including 5% oil/fat) | 20% |
| Oil | 5% |

As can be seen, the oil pick-up during the frying of the coated product is only 5%, and the total oil content is only 10% whereas the oil content of a conventional pre-fried product is usually at least 15%.

When this product is prepared for consumption by oven heating, the potato strips are easily identifiable as potato, they have a crunchy bite and give the experience of eating real potato.

We claim:

1. A food product comprising a foodstuff coated with an edible heat-settable adhesive fluid which is coated with frozen pre-fried particles of fresh root vegetables which have a moisture content of from 20% to 50% by weight based on the total weight of the frozen pre-fried particles.

2. A food product according to claim 1 wherein the frozen pre-fried particles of fresh root vegetables have been pre-fried in oil.

3. A food product according to claim 2 wherein the frozen pre-fried particles of fresh root vegetables have been pre-fried in the oil at a temperature from 165° C. to 195° C. for from 30 seconds to 90 seconds.

4. A food product according to claim 1 wherein the frozen pre-fried particles of fresh root vegetables have a moisture content of from 25% to 45%.

5. A food product according to claim 1 further comprising a dusting of a material selected from the group consisting of flour and starch between the foodstuff and the adhesive fluid.

6. A food product according to claim 1 wherein the foodstuff is frozen.

7. A food product according to claim 1 wherein the adhesive fluid is a batter.

8. A food product according to claim 1 wherein the adhesive fluid is a Tempura batter.

9. A food product according to claim 1 wherein the frozen pre-fried particles of fresh root vegetables are potatoes.

10. A food product according to claim 1 wherein each of the frozen, pre-fried particles have a volume of from 30 to 250 cubic millimetres.

11. A food product according to claim 1 wherein the frozen pre-fried particles of fresh root vegetables have been blanched prior to being pre-fried and frozen.

* * * * *

UNITED STATES PATENT AND TRADEMARK OFFICE
CERTIFICATE OF CORRECTION

PATENT NO. : 5,015,484

DATED : May 14, 1991

INVENTOR(S) : Peter Palmlin, et al.

It is certified that error appears in the above-identified patent and that said Letters Patent is hereby corrected as shown below:

On the title page of the patent, under the heading U.S. PATENT DOCUMENTS, line 7, "Blantz" should be --Glantz--.

Column 1, line 54, "heatsettable" should be --heat-settable--.

Column 3, line 40, "products" should be --product-- and a comma should appear after --product--.

Signed and Sealed this

Twenty-first Day of July, 1992

*Attest:*

DOUGLAS B. COMER

*Attesting Officer*   Acting Commissioner of Patents and Trademarks